United States Patent
Lee et al.

(10) Patent No.: US 11,722,915 B2
(45) Date of Patent: *Aug. 8, 2023

(54) V2X COMMUNICATION PERFORMANCE METHOD PERFORMED BY V2X TERMINAL IN WIRELESS COMMUNICATION SYSTEM, AND TERMINAL USING THE METHOD

(71) Applicant: LG Electronics Inc., Seoul (KR)

(72) Inventors: Seungmin Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 5 days.

This patent is subject to a terminal disclaimer.

(21) Appl. No.: 17/234,050

(22) Filed: Apr. 19, 2021

(65) Prior Publication Data
US 2021/0243627 A1    Aug. 5, 2021

Related U.S. Application Data

(63) Continuation of application No. 16/497,240, filed as application No. PCT/KR2018/003553 on Mar. 26, 2018, now Pat. No. 11,006,298.

(Continued)

(51) Int. Cl.
*H04W 24/08* (2009.01)
*H04W 4/46* (2018.01)
(Continued)

(52) U.S. Cl.
CPC .......... *H04W 24/08* (2013.01); *H04L 5/0053* (2013.01); *H04W 4/46* (2018.02); *H04W 74/08* (2013.01); *H04W 76/14* (2018.02)

(58) Field of Classification Search
CPC ....... H04W 24/08; H04W 4/46; H04W 74/08; H04W 76/14; H04W 4/40;
(Continued)

(56) References Cited

U.S. PATENT DOCUMENTS

2007/0047485 A1*  3/2007  Gorokhov ........... H04W 72/542
                                                    370/468
2009/0213750 A1*  8/2009  Gorokhov ........... H04W 72/542
                                                    370/336

(Continued)

FOREIGN PATENT DOCUMENTS

CN    104683427 A    6/2015
CN    106105305 A    11/2016

(Continued)

OTHER PUBLICATIONS

LG Electronics Inc., "Channel busy ratio reporting," 3GPP TSG RAN WG2 Meeting #97, Athens, Greece, Feb. 13-17, 2021, R2-1701978, Feb. 4, 2017 (4 Pages).

(Continued)

*Primary Examiner* — Wutchung Chu
(74) *Attorney, Agent, or Firm* — Dentons US LLP

(57) ABSTRACT

The present invention provides a V2X communication performance method which is performed by a vehicle-to-X (V2X) terminal in a wireless communication system, and which is based on a relatively short transmission time interval (S-TTI) compared to a legacy transmission time interval (L-TTI), whereby a channel busy ratio (CBR) or a channel occupancy ratio (CR) for the S-TTI-based V2X communication is measured, and the S-TTI-based V2X communication is performed based on the measured CBR or CR, wherein the S-TTI has a variable length.

5 Claims, 19 Drawing Sheets

Related U.S. Application Data

(60) Provisional application No. 62/476,726, filed on Mar. 25, 2017.

(51) Int. Cl.
*H04W 76/14* (2018.01)
*H04L 5/00* (2006.01)
*H04W 74/08* (2009.01)

(58) Field of Classification Search
CPC ......... H04W 72/0486; H04W 72/0446; H04W 72/00; H04W 74/0808; H04W 72/52; H04L 5/0053; H04L 5/0007; G08G 1/005; G08G 1/096716; G08G 1/096783; G08G 1/096791
See application file for complete search history.

(56) References Cited

U.S. PATENT DOCUMENTS

| | | | |
|---|---|---|---|
| 2015/0156662 A1* | 6/2015 | Bai | H04W 4/80 370/231 |
| 2017/0055248 A1 | 2/2017 | Moon et al. | |
| 2017/0303302 A1* | 10/2017 | Bagheri | H04W 72/042 |
| 2018/0206265 A1* | 7/2018 | Lee | H04W 72/23 |
| 2018/0279344 A1* | 9/2018 | Bagheri | H04W 72/0446 |
| 2018/0309532 A1* | 10/2018 | Shimezawa | H04W 72/0446 |
| 2019/0373560 A1* | 12/2019 | Ouchi | H04W 72/23 |
| 2020/0015176 A1* | 1/2020 | Li | H04L 1/1861 |
| 2020/0053675 A1* | 2/2020 | Khoryaev | H04L 5/001 |
| 2020/0275458 A1* | 8/2020 | Khoryaev | H04W 4/44 |

FOREIGN PATENT DOCUMENTS

| | | |
|---|---|---|
| EP | 3346756 A1 | 7/2018 |
| KR | 101506598 | 3/2015 |
| WO | 2017/014560 A1 | 1/2017 |
| WO | 2017038895 A1 | 3/2017 |
| WO | 2018175528 A1 | 9/2018 |
| WO | WO-2018175528 A1 * | 9/2018 ........... H04L 5/0087 |

OTHER PUBLICATIONS

Ericsson, "L1 Format for V2V Transmissions using Sidelink", 3GPP TSG-RAN WG1 Meeting #84bis, Busan, South Korea, Apr. 11-15, 2016, R1-162825, Apr. 1, 2016 (5 Pages).

Huawei, HiSilicon, "TTI Switching Between sTTI and Legacy TTI," 3GPP TSG RAN WG2 Meeting #97 , Athens, Greece, Feb. 13-17, 2017, R2-1701885, Apr. 2, 2017 (4 Pages).

R1-1704141: 3GPP TSG RAN WG1; Meeting #88, Athens, Greece, Feb. 13-17, 2017, LG Electronics, List of agreements for "LTE-based V2X Support," pp. 1-20.

R2-167769:3GPP TSG-RAN2 Meeting #96, Reno, Nevada, USA, Nov. 14-18, 2016, Intel Corporation, "Protocol impacts of TTI Shortening," pp. 1-4.

R2-1708511: 3GPP TSG RAN WG2; Meeting #99, Berlin, Germany, Aug. 21-25, 2017, ZTE, "Consideration on Short TTI based PC5 Operation," pp. 1-5.

3GPP TS 36.211 V8.5.0, Dec. 2008.

ZTE et al., "Discussion on Short TTI with eV2X," R1-1704655, 3GPP TSG RAN WG1 Meeting #88bis, Mar. 24, 2017, see sections 2-4.

Ericsson, "Short TTI Transmission for PC5-based V2X," R1-1705786, 3GPP TSG-RAN WG1 Meeting #88bis, Mar. 24, 2017, see section 2.

LG Electronics, "Remaining Issues on Congestion Control for PC5-based V2X," R1-1702397, 3GPP TSG RAN WG1 Meeting #88, Feb. 7, 2017, see section 2.

LG Electronics, "Summary of Email Discussion [87-17] on the FFS Points in the Congestion Control," R1-1703444, 3GPP TSG RAN WG1 Meeting #88, Feb. 9, 2017, see section 2.

Khoryaev et al. U.S. Appl. No. 62/475,690, filed Mar. 23, 2017 (Year: 2017).

Khoryaev et al. U.S. Appl. No. 62/476,147, filed Mar. 24, 2017 (Year: 2017).

Li et al. CN201710184583.1 filed on Mar. 24, 2017 (Year: 2017).

* cited by examiner

V2X COMMUNICATION PERFORMANCE METHOD PERFORMED BY V2X TERMINAL IN WIRELESS COMMUNICATION SYSTEM, AND TERMINAL USING THE METHOD

This application is a continuation of U.S. application Ser. No. 16/497,240 filed Sep. 24, 2019, which is the National Stage filing under 35 U.S.C. 371 of International Application No. PCT/KR2018/003553, filed on Mar. 26, 2018, which claims the benefit of U.S. Provisional Application No. 62/476,726 filed on Mar. 25, 2017, the contents of which are all hereby incorporated by reference herein in their entirety.

FIELD

The present document relates to wireless communication, and more particularly, to a method for performing V2X communication performed by a V2X terminal in a wireless communication system and a terminal using the method.

RELATED ART

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks. The D2D communication described above may be extended and applied to signal transmission/reception between vehicles, and the communication related to a vehicle is referred to as VEHICLE-TO-EVERYTHING (V2X) communication, particularly. In the term V2X, the term 'X' means PEDESTRIAN (COMMUNICATION BETWEEN A VEHICLE AND A DEVICE CARRIED BY AN INDIVIDUAL (e.g., HANDHELD TERMINAL CARRIED BY A PEDESTRIAN, CYCLIST, DRIVER OR PASSENGER), at this time, V2X may be denoted as V2P), VEHICLE (COMMUNICATION BETWEEN VEHICLES) (V2V), INFRASTRUCTURE/ NETWORK (COMMUNICATION BETWEEN A VEHICLE AND A ROADSIDE UNIT (RSU)/NETWORK (ex) RSU IS A TRANSPORTATION INFRASTRUCTURE ENTITY (ex) AN ENTITY TRANSMITTING SPEED NOTIFICATIONS) IMPLEMENTED IN AN eNB OR A STATIONARY UE)) (V2I/N), and the like. The (V2P communication related) device owned by a pedestrian (or a person) is named as "P-UE", and the (V2X communication related) device installed on a VEHICLE is named as "V-UE". In the present document, the term 'ENTITY' may be interpreted to at least one of P-UE, V-UE and RSU (/NETWORK/INFRASTRUCTURE).

As described above, in the conventional case, TRANSMISSION TIME INTERVAL(TTI) is determined in a unit of 1 ms. In the foregoing communication system, it is assumed that V2X communication based on TTI shorter than existing case is introduced.

In such a situation, since it is assumed that only terminals performing wireless communication based on the legacy TTI (e.g., 1 ms) are existed previously, there is not separate definition of a way of performing CBR and/or CR measurement when a terminal performs V2X communication based on short TTI.

Accordingly, in the case that the short TTI (i.e., S-TTI) is introduced, it is required a definition for a way of performing CBR and/or CR measurement for the short TTI performed by a terminal that performs V2X communication based on short TTI.

Therefore, in the present document, when a V2X terminal performs V2X communication based on S-TTI, it is provided a method for measuring CBR and/or CR and a device for using the same.

SUMMARY

Accordingly, an object of the present document is to provide a method for performing V2X communication performed by a V2X terminal in a wireless communication system and a terminal using the method.

In an aspect, a method for performing a V2X communication based on a short transmission time interval (S-TTI) relatively shorter than a legacy transmission time interval (L-TTI) in a wireless communication system is provided. The method performed by a vehicle-to-X (V2X) User Equipment (UE) may comprise measuring a channel busy ratio (CBR) or a channel occupancy ratio (CR) for the V2X communication based on S-TTI; and performing the V2X communication based on S-TTI based on the measured CBR or the measured CR, the S-TTI has a variable length.

The L-TTI may correspond to a plurality of the S-TTIs.

When the S-TTI is a basic resource unit, the L-TTI may be a combination of K basic resource units, and the K is a positive integer.

When the L-TTI is a basic resource unit, the S-TTI may be a division of the basic resource unit divided into X, and the X is a positive integer.

When the V2X UE measures the CBR or the CR, the measurement may be performed in a subchannel unit based on the L-TTI, and a duration of the measurement is determined in the L-TTI unit.

When the V2X UE measures the CBR or the CR, the measurement may be performed in a subchannel unit based on the S-TTI, and a duration of the measurement is determined in the L-TTI unit.

When the V2X UE measures the CBR or the CR, the measurement may be performed in a subchannel unit based on the S-TTI, and a duration of the measurement is determined in the S-TTI unit.

When the S-TTI on a timing of subtracting a minimum processing time from the S-TTI for the V2X UE to perform a transmission corresponds to a Wth S-TTI in the L-TTI having index Z value, the V2X UE may measure the CBR in a subchannel unit based on the S-TTI from a timing of subtracting 100 S-TTI lengths from the Wth S-TTI in the L-TTI having index Z value to a timing of subtracting 1

S-TTI length from the Wth S-TTI in the L-TTI having index Z value, the Z is an integer of 0 or more, and the W is a positive integer.

When the S-TTI on a timing of subtracting a minimum processing time from the S-TTI for the V2X UE to perform a transmission corresponds to a Wth S-TTI in the L-TTI having index Z value, the V2X UE may measure the CBR in a subchannel unit based on the S-TTI from a timing of subtracting A from the Wth S-TTI in the L-TTI having index Z value to a timing of adding B to the Wth S-TTI in the L-TTI having index Z value, the Z is an integer of 0 or more, the W is a positive integer, each the A and the B is in a unit of 1 S-TTI length, a value adding the B and 1 S-TTI length to the A has 1000 S-TTI lengths, and the A is equal to or greater than 500 S-TTI lengths.

The V2X UE may determine whether the V2X communication based on L-TTI and the V2X communication based on S-TTI are coexisted, and the V2X UE measures the CBR or the CR based on whether the V2X terminal determines whether the V2X communication based on L-TTI and the V2X communication based on S-TTI are coexisted.

In another aspect, a vehicle-to-X (V2X) User Equipment (UE) for performing a V2X communication based on a short transmission time interval (S-TTI) relatively shorter than a legacy transmission time interval (L-TTI) in a wireless communication system is provided. The V2X UE may comprise a Radio Frequency transceiver for transmitting and receiving a radio signal; and a processor operating with being combined with the RF transceiver, wherein the processor is configured to perform: measuring a channel busy ratio (CBR) or a channel occupancy ratio (CR) for the V2X communication based on S-TTI; and performing the V2X communication based on S-TTI based on the measured CBR or the measured CR, wherein the S-TTI has a variable length.

According to the present document, in the case that the short TTI (i.e., S-TTI) is introduced, it is provided a way of performing CBR measurement and/or CR measurement for the short TTI performed by a terminal that performs V2X communication based on short TTI.

According to the present document, together with the definition for the above matter (or separately), in the case that a terminal supporting V2X communication based on short TTI and a terminal supporting V2X communication based on the legacy TTI only are coexisted, it is provided a way of performing CBR measurement and/or CR measurement such that the terminal supporting V2X communication based on short TTI coexists efficiently with the terminal supporting V2X communication based on the legacy TTI only.

DESCRIPTION OF EXEMPLARY EMBODIMENTS

A definition of a term and an abbreviation of a term described in this specification to be described hereinafter may be defined in 3 gpp TS 36 series unless there is separate description.

Figure 1:
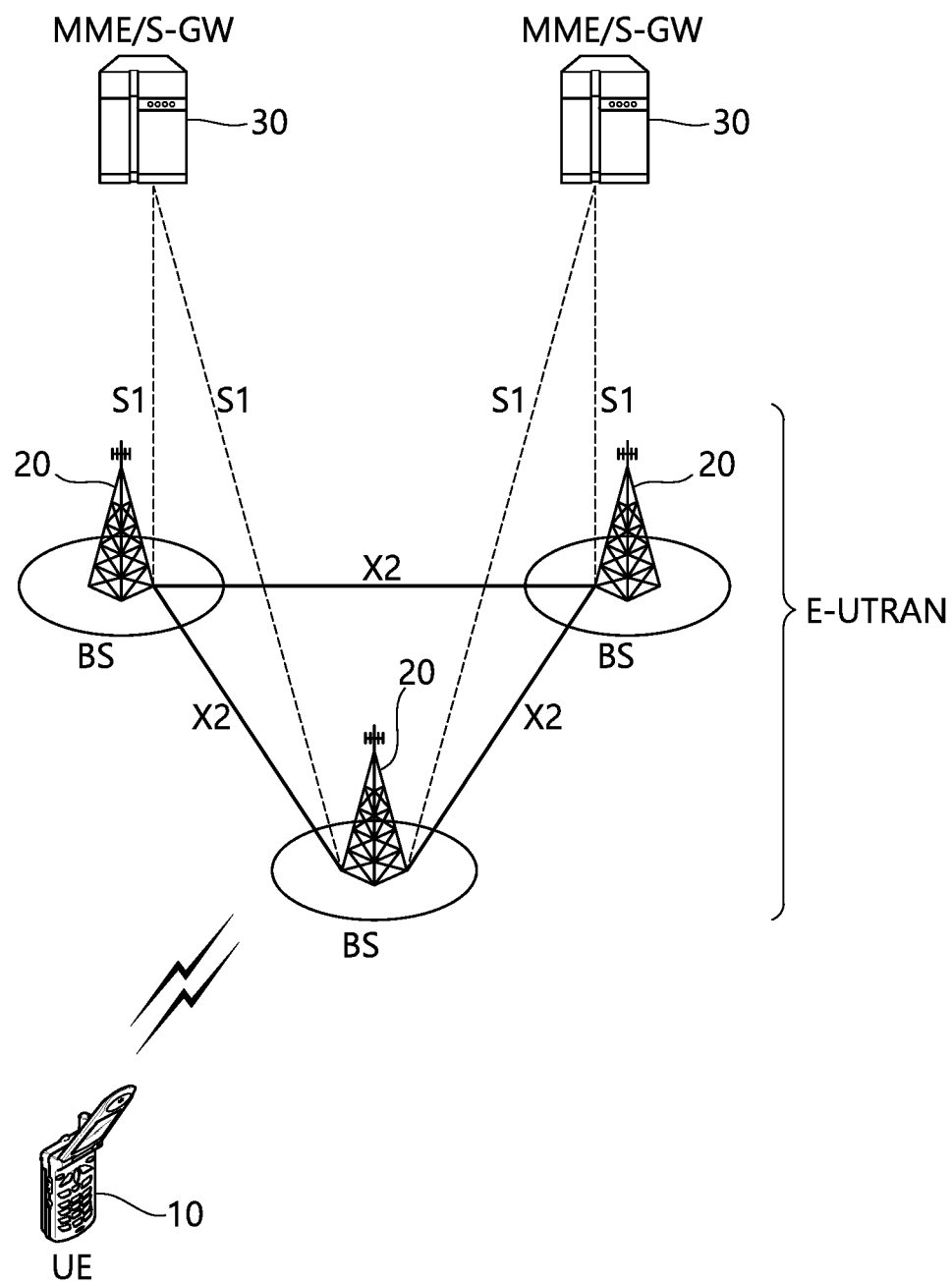
FIG. 1 shows a wireless communication system to which the present document is applied.

FIG. 1 shows a wireless communication system to which the present document is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 2:
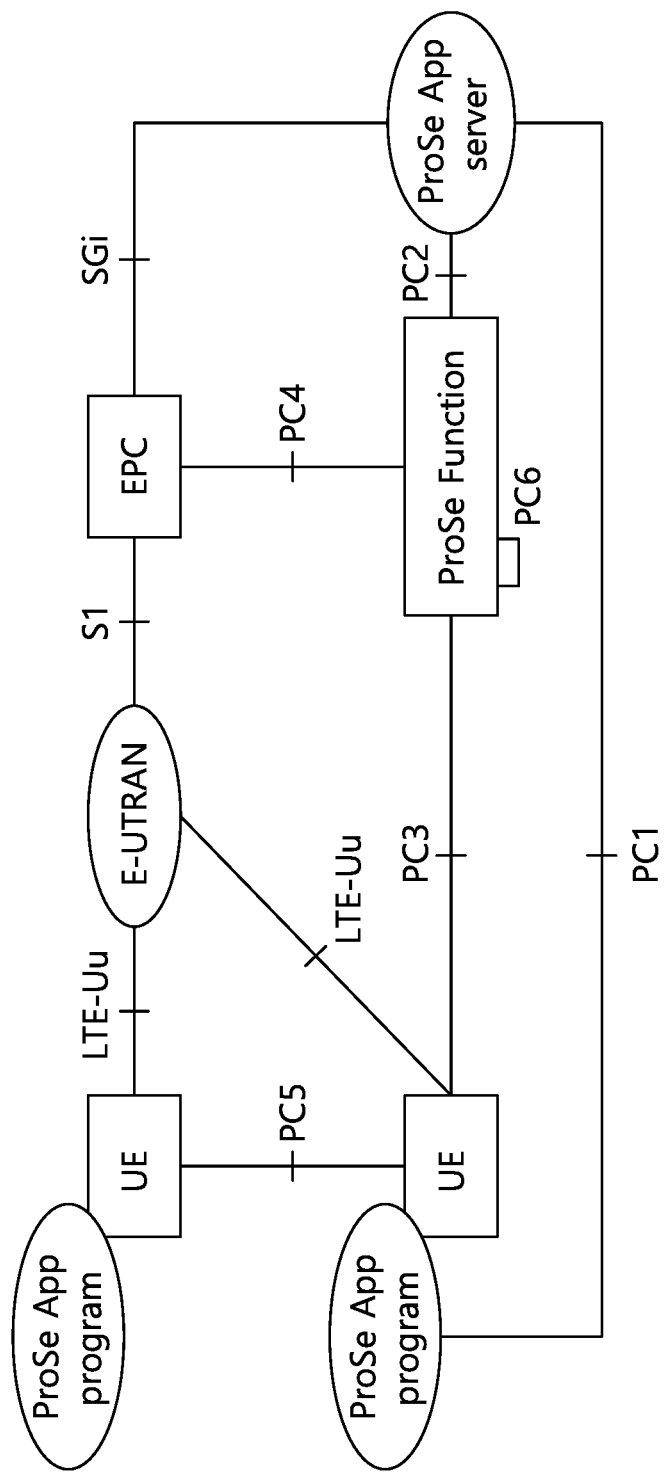
FIG. 2 illustrates a reference structure for a ProSe.

FIG. 2 illustrates a reference structure for a ProSe.

Referring to FIG. 2, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 3:
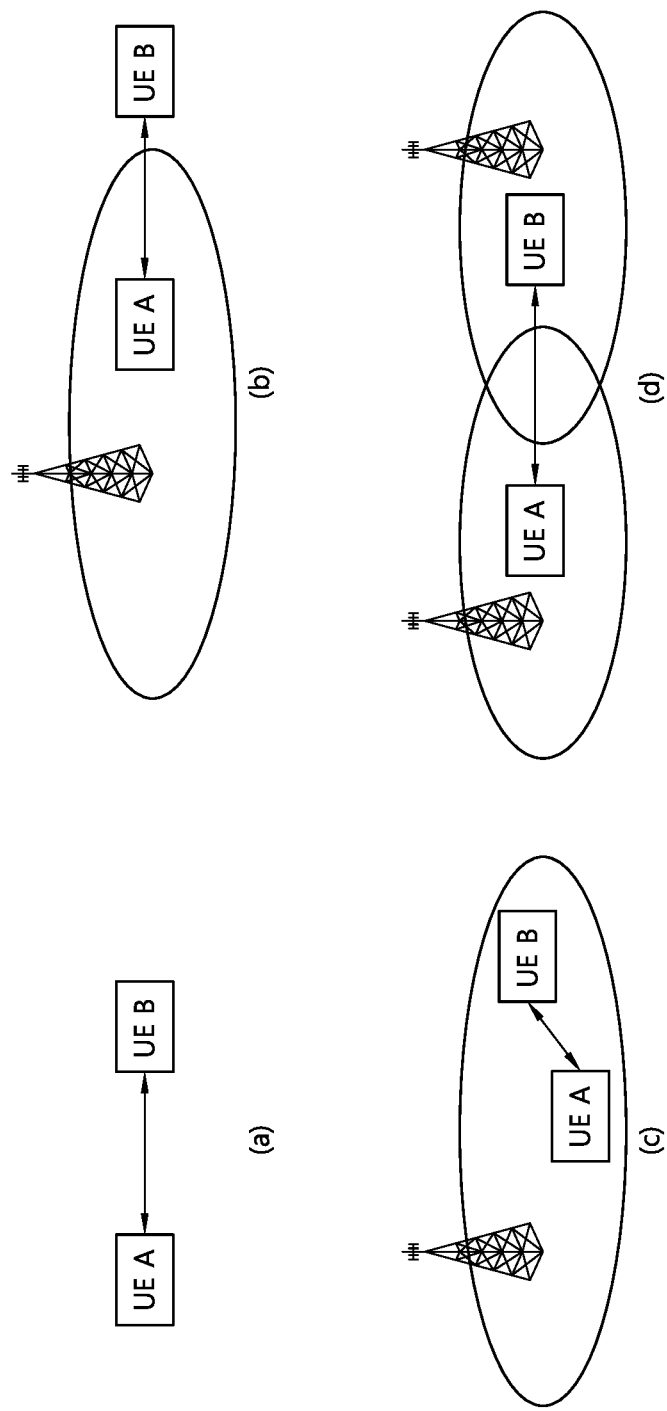
FIG. 3 illustrates arrangement examples of terminals performing ProSe direct communication and cell coverage.

FIG. 3 illustrates arrangement examples of terminals performing ProSe direct communication and cell coverage.

Referring to FIG. 3(a), UEs A and B may be located outside of the cell coverage. Referring to FIG. 3(b), the UE A may be located in the cell coverage and the UE B may be located outside of the cell coverage. Referring to FIG. 3(c), both of UEs A and B may be located in the cell coverage. Referring to FIG. 3(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 4:
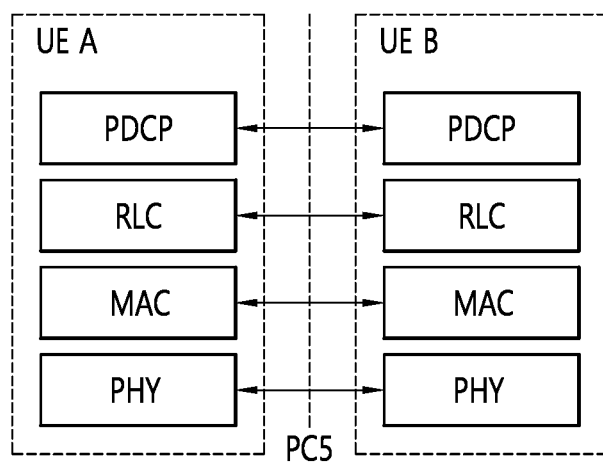
FIG. 4 illustrates a user plane protocol stack for the ProSe direct communication.

FIG. 4 illustrates a user plane protocol stack for the ProSe direct communication.

Referring to FIG. 4, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 5:
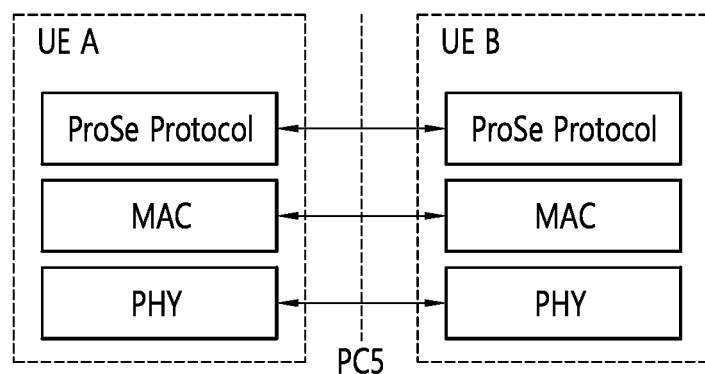
FIG. 5 illustrates a PC 5 interface for D2D discovery.

FIG. 5 illustrates a PC 5 interface for D2D discovery.

Referring to FIG. 5, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 6:
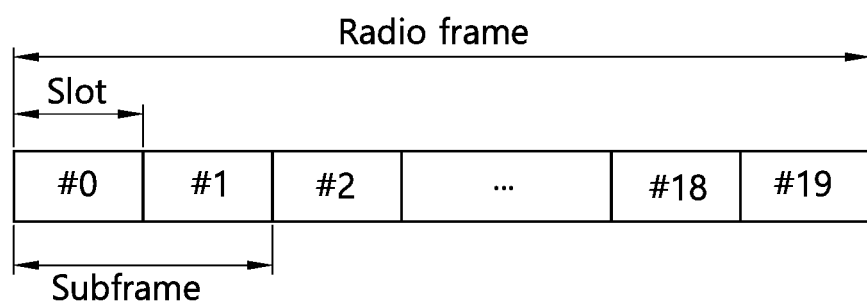
FIG. 6 illustrates the radio frame architecture of 3GPP LTE.

FIG. 6 illustrates the radio frame architecture of 3GPP LTE.

Referring to FIG. 6, a radio frame includes 10 subframes, and a single subframe includes two slots. As an example, the time required for transmitting a single subframe is referred to as a transmission time interval (TTI). A TTI may be a minimum unit of scheduling. The radio frame architecture is just an example, but the number of subframes included in a radio frame and the number slots included in a subframe may be changed in various manner.

Figure 7:
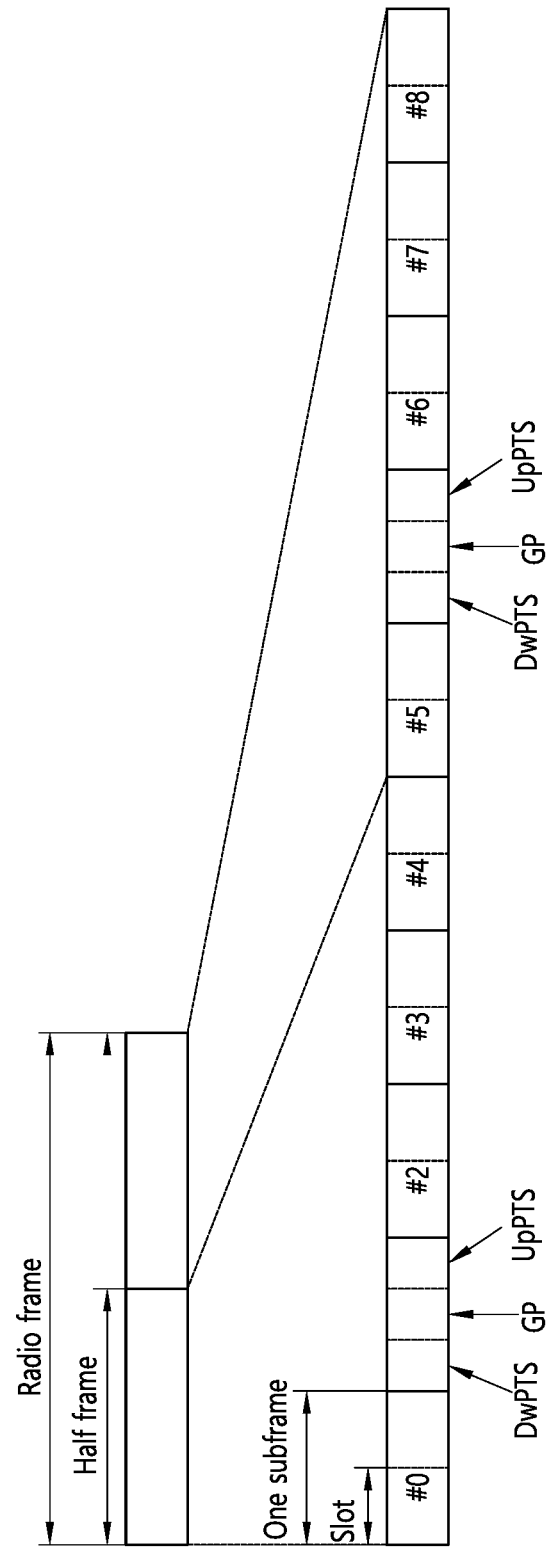
FIG. 7 illustrates the architecture of a Time Division Duplex (TDD) radio frame.

FIG. 7 illustrates the architecture of a Time Division Duplex (TDD) radio frame.

Referring to FIG. 7, Sub-frames having index #1 and index #6 are denoted special sub-frames and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of UL-DL configuration of a radio frame.

TABLE 1

| UL-DL configuration | DL-to-UL periodicity Switch-point | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL configuration | DL-to-UL periodicity Switch-point | Subframe n | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

In Table 1, 'D' denotes a DL sub-frame, IF a UL sub-frame, and 'S' a special sub-frame. When receiving a UL-DL configuration from the base station, the terminal may be aware of whether a sub-frame is a DL sub-frame or a UL sub-frame according to the configuration of the radio frame. Hereinafter, UL-DL configuration N (N is one of 0 to 6) may refer to Table 1 above.

Figure 8:
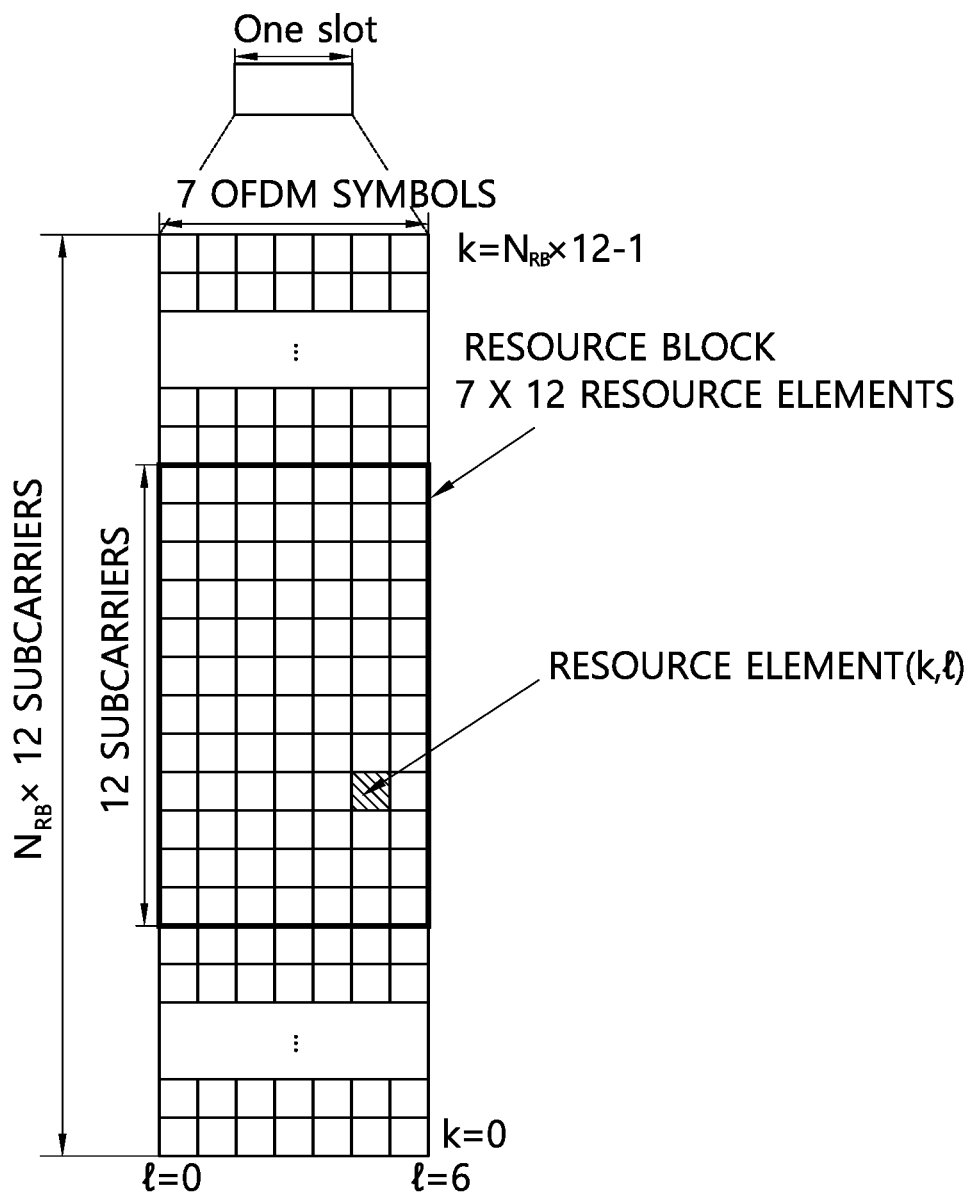
FIG. 8 is a diagram illustrating a resource grid for a single downlink slot.

FIG. 8 is a diagram illustrating a resource grid for a single downlink slot.

In a radio frame, one slot includes a plurality of orthogonal frequency division multiplexing (OFDM) symbols in a time domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used. It is described that one slot includes 7 OFDM symbols as an example, but the number OFDM symbols included in one symbol may be changed depending on a length of Cyclic Prefix (CP). According to 3GPP TS 36.211 V8.5.0(2008-12), 1 subframe includes 7 OFDM symbols in a normal CP and includes 6 OFDM symbols in an extended CP.

In addition, one slot includes multiple resource blocks (RBs) in a frequency domain. The RB is a resource allocation unit and includes multiple consecutive subcarriers in one slot. A subcarrier spacing may be, for example, 15 kHz in the RB.

Each element on the resource grid is referred to as a resource element (RE), and one RB includes 12×7 resource elements. The number $N_{DL}$ of RBs included in the downlink slot depends on a downlink transmission bandwidth determined in a cell. The resource grid described in FIG. 8 may also apply to uplink transmission.

Figure 9:
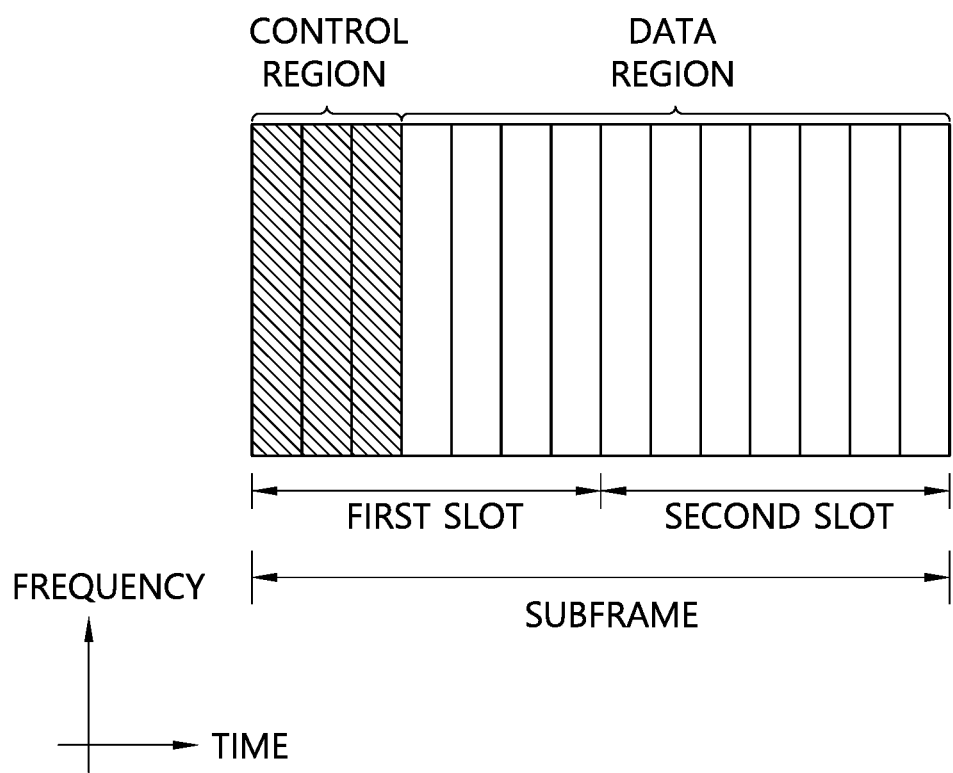
FIG. 9 illustrates the architecture of a downlink subframe.

FIG. 9 illustrates the architecture of a downlink subframe.

Referring to FIG. 9, the subframe includes two consecutive slots. A maximum of three OFDM symbols located in a front portion of a first slot within the subframe correspond to a control region to which control channels are allocated, and the remaining OFDM symbols correspond to a data region to which a data channel is allocated. The control region may include maximum 4 OFDM symbols depending on a system bandwidth.

Control channels allocated in a control region include a physical control format indicator channel (PCFICH), a physical hybrid-ARQ indicator channel (PHICH) and a physical downlink control channel (PDCCH). The PCFICH is a control channel through which information indicating the number of OFDM symbols included in the control region is transmitted. The PHICH is a control channel that carries an acknowledgement/not-acknowledgement (ACK/NACK) for an uplink data transmission of a UE. The PDCCH may carry a transport format, a downlink shared channel (DL-SCH)'s resource allocation (this is referred to as downlink (DL) grant), resource allocation information on an uplink shared channel (UL-SCH) (this is referred to as uplink (UL) grant), paging information on a paging channel (PCH), system information on the DL-SCH, a resource allocation of a higher-layer control message such as a random access response transmitted on the PDSCH, an aggregation of transmit power control (TPC) commands for individual UEs in any UE group, activation of a voice over Internet (VoIP), and the like. The control information transmitted through a PDCCH may be referred to as downlink control information (DCI).

DCI format includes format 0 for Physical Uplink Shared Channel (PUSCH) scheduling, format 1 for scheduling one Physical Downlink Shared channel (PDSCH) codeword, format 1A for compact scheduling of one PDSCH codeword, format 1B for compact scheduling of a single codeword rank-1 transmission in spatial multiplexing mode, format 1C for very compact scheduling of a Downlink Shared Channel (DL-SCH), format 1D for PDSCH scheduling in a multi-user spatial multiplexing mode, format 2 for PDSCH scheduling in Closed-loop spatial multiplexing mode, format 2A for PDSCH scheduling in Open-loop spatial multiplexing mode, format 3 for transmitting Transmission Power Control (TPC) command of 2 bits power control for PUCCH and PUSCH, and format 3A for transmitting TPC command of 1 bit power control for PUCCH and PUSCH.

<V2X (Vehicle-to-X) Communication>

As described above, D2D operation generally provides various advantages in that it supports signal transmission and reception between devices adjacent to each other. For example, a D2D UE may perform data communication with a high transmission rate and low latency. Also, D2D operation may disperse traffic concentrated at a base station, and if a UE performing a D2D operation acts as a relay, D2D operation may extend the coverage of the base station. As an extension of the D2D communication, vehicle-related communication including signal transmission and reception between vehicles is particularly called Vehicle-to-X (V2X) communication.

In one example, the 'X' in the V2X represents pedestrian (communication between a vehicle and a device carried by individual (for example, handheld UE carried by a pedestrian, cyclist, driver, or passenger), where, in this case, V2X may be expressed by V2P), vehicle (communication between vehicles, V2V), infrastructure/network (communication between a vehicle and a roadside unit (RSU)/network, where RSU is a transportation infrastructure entity, for example, an entity transmitting speed notifications implemented in an eNB or a stationary UE, V2I/N). Here, as an example, in the term VEHICLE-TO-X (V2X), the term 'X' means PEDESTRIAN (COMMUNICATION BETWEEN A VEHICLE AND A DEVICE CARRIED BY AN INDIVIDUAL (e.g., HANDHELD TERMINAL CARRIED BY A PEDESTRIAN, CYCLIST, DRIVER OR PASSENGER), at this time, V2X may be denoted as V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (ex) RSU IS A TRANSPORTATION INFRASTRUCTURE ENTITY (ex) AN ENTITY TRANSMITTING SPEED NOTIFICATIONS) IMPLEMENTED IN AN eNB OR A STATIONARY UE)) (V2I/N), and the like. In addition, in one example, for the convenience of description of the proposed method, a (V2P communication-related) device carried by a pedestrian (or person) is called a "P-UE" while a (V2X communication-related) device installed in a vehicle is called a "V-UE". Also, in one example, the term 'entity' in this document may be interpreted as P-UE, V-UE or RSU (/network/infrastructure).

A V2X UE may perform message (or channel) transmission on a predefined (or signaled) resource pool. Here, a resource pool may refer to a predefined resource(s) which enables a UE to perform a V2X operation (or which is capable of performing a V2X operation). At this time, a resource pool may also be defined in terms of time-frequency aspect.

<S-RSSI>

Sidelink RSSI (S-RSSI) may be defined as the linear average of the total received power (in [W]) per SC-FDMA symbol observed by the UE only in the configured subchannel in SC-FDMA symbols 1, 2, . . . , 6 of the first slot and SC-FDMA symbols 0, 1, . . . , 5 of the second slot of a subframe.

Here, a reference point of the S-RSSI may be an antenna connector of the UE.

If receiver diversity is in use by the UE, the reported value may not be lower than the corresponding S-RSSI of any of the individual diversity branches.

The S-RSSI may be applied to RRC_IDLE intra-frequency, RRC_IDLE inter-frequency, RRC_CONNECTED intra-frequency, and RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Here, the reference point for the PSSCH-RSRP may be the antenna connector of the UE.

If receiver diversity is in use by the UE, the reported value may not be lower than the corresponding PSSCH-RSRP of any of the individual diversity branches The PSSCH-RSRP may be applied to RRC_IDLE intra-frequency, RRC_IDLE inter-frequency, RRC_CONNECTED intra-frequency and RRC_CONNECTED inter-frequency.

Here, the power per resource element may be determined from the energy received during the useful part of the symbol, excluding the CP.

<Channel Busy Ratio (CBR)>

Channel Busy Ratio (CBR) Measured in Subframe n is Defined as Follows:

CBR may mean, for PSSCH, the portion of sub-channels in the resource pool whose S-RSSI measured by the UE exceed a pre-configured threshold sensed over subframes [n−100, n−1].

CBR may mean, for PSCCH, in a pool pre-configured such that PSCCH may be transmitted with its corresponding PSSCH in non-adjacent resource blocks, the portion of the resources of the PSCCH pool whose S-RSSI measured by the UE exceed a pre-configured threshold sensed over subframes [n−100, n−1], assuming that the PSCCH pool is composed of resources with a size of two consecutive PRB pairs in the frequency domain.

The CBR may be applied to RRC_IDLE intra-frequency, RRC_IDLE inter-frequency, RRC_CONNECTED intra-frequency and RRC_CONNECTED inter-frequency.

Here, the subframe index may be based on physical subframe index.

<Channel Occupancy Ratio (CR)>

Channel occupancy ratio (CR) evaluated at subframe n is defined as below.

The CR may mean the total number of sub-channels used for its transmissions in subframes [n−a, n−1] and granted in subframes [n, n+b] divided by the total number of configured sub-channels in the transmission pool over [n−a, n+b].

The CR may be applied to RRC_IDLE intra-frequency, RRC_IDLE inter-frequency, RRC_CONNECTED intra-frequency and RRC_CONNECTED inter-frequency.

Here, a may be a positive integer and b may be 0 or a positive integer. a and b may be determined by UE implementation with 'a+b+1=1000', 'a>=500', and 'n+b should not exceed the last transmission opportunity of the grant for the current transmission'.

Here, CR may be evaluated for each (re)transmission.

Here, in evaluating CR, the UE may assume the transmission parameter used at subframe n is reused according to the existing grant(s) in subframes [n+1, n+b] without packet dropping.

Here, the subframe index may be based on physical subframe index.

Here, the CR may be computed per priority level

<Sidelink Channel Scrambling>

PSSCH scrambling sequence generator may be initialized to $c_{init}=N_{ID}^{X}\cdot 2^{14}+n_{ssf}^{PSSCH}\cdot 2^{9}+510$ at a starting position of every PSSCH subframe. Here, $n_{ssf}^{PSSCH}$ represents a (current) Sidelink subframe number in a subframe pool for a PSSCH.

At this time, for Sidelink transport modes 3 and 4, $n_{ID}^{X}$ is derived as a mathematical expression of calculating $$\sum_{i=0}^{L-1} p_i \cdot 2^{L-1-i},$$

which represents a CRC on a PSCCH transmitted in the same subframe as a PSSCH as a decimal number. Here, p in the mathematical expression means a parity bit in a CRC generation, and L means the number of the corresponding parity bits. The parity bit may be generated by one of the following cyclic generator polynomials.

$g_{CRC24A}(D)=[D^{24}+D^{23}+D^{18}+D^{17}+D^{14}+D^{11}+D^{10}+D^{7}+D^{6}+D^{5}+D^{4}+D^{3}+D+1]$;

$g_{CRC24B}(D)=[D^{24}+D^{23}+D^{6}+D^{5}+D+1]$ for a CRC length L=24;

$g_{CRC16}(D)=[D^{16}+D^{12}+D^{5}+1]$ for a CRC length L=16.

$g_{CRC8}(D)=[D^{8}+D^{7}+D^{4}+D^{3}+D+1]$ for a CRC length of L=8.

<Demodulation Reference Signal (DMRS) in Sidelink>

A DM-RS sequence associated with PSSCH, PSCCH and PSBCH may be generated as below.

$$r_{PUSCH}^{(\lambda)}(m \cdot M^{RS}+n)=w^{(\lambda)}(m)r_{u,v}^{(\alpha\lambda,\delta)}(n) \quad \text{<Equation 1>}$$

Herein, m is 0 for a special subframe and 0 or 1 otherwise. n satisfies n=0, . . . , $M_{sc}^{RS}-1$. $M_{sc}^{RS}$ is a length of reference signal represented in terms of the number of subcarriers. δ is 0 or 1. u is a sequence group number in slot $n_s$, and v is a basic sequence number. u may be determined based on $n_{ID}^{RS}$ and $f_{ss}$.

αλ, is a cyclic shift value in slot $n_s$ and may be given as below.

$$\alpha_\lambda = 2\pi n_{cs,\lambda}/12 \quad \text{<Equation 2>}$$

The parameters shown in Equation 1 and Equation 2 above may be determined as represented in the following table in the case of a reference signal (DM-RS) for a PSSCH.

TABLE 2

| Parameter | | PSSCH Sidelink transport modes 3 and 4 |
|---|---|---|
| Group hopping | | enabled |
| | $n_{ID}^{RS}$ | $n_{ID}^{X}$ |
| | $n_s$ | First DM-RS symbol of $2n_{ss}^{PSSCH}$ slot |
| | | Second DM-RS symbol of $2n_{ss}^{PSSCH} + 1$ slot |
| | $f_{ss}$ | $\lfloor n_{ID}^{X}/16 \rfloor \bmod 30$ |
| Sequence hopping | | disabled |
| Cyclic shift | $n_{cs,\lambda}$ | $\lfloor n_{ID}^{X}/2 \rfloor \bmod 8$ |
| Orthogonal sequence | $\lfloor w^\lambda(\cdot) \rfloor$ | $[+1 +1 +1 +1]$ if $n_{ID}^{X} \bmod 2 = 0$ |
| | | $[+1 -1 +1 -1]$ if $n_{ID}^{X} \bmod 2 = 1$ |
| Reference signal length | $M_{sc}^{RS}$ | $M_{sc}^{PSSCH}$ |
| Number of layers | $\upsilon$ | 1 |
| Number of antenna ports | P | 1 |

$n_{ID}^{RS}$ is an ID related to Sequence group hopping. $n_s$ represents a slot number, and $f_{SS}$ represents a sequence shift pattern.

$n_{CS,\lambda}$ is a cyclic shift value. In Sidelink transport modes 3 and 4, for a PSSCH and a PSCCH, a symbol to which a DM-RS is mapped may be l=2, 5 (i.e., third symbol and sixth symbol) in a first slot and may be l=1, 4 (i.e., second symbol and fifth symbol) in a second slot.

In Sidelink transport modes 3 and 4, for a PSBCH, a symbol to which a DM-RS is mapped may be l=4, 6 (i.e., fifth symbol and seventh symbol) in a first slot and may be l=2 (i.e., third symbol) in a second slot.

In Sidelink transport modes 3 and 4, a pseudo-random sequence generator may be initialized at a start of each slot that satisfies $n_{ss}^{PSSCH} \bmod 2 = 0$. $n_{ss}^{PSSCH}$ represents a (current) Sidelink slot number in a subframe pool for a PSSCH.

In Sidelink transport modes 3 and 4, for a PSCCH, a cyclic shift $n_{cs,\lambda}$ to be applied to all DM-RSs in a subframe may be randomly selected among {0, 3, 6, 9}.

In Sidelink transport modes 3 and 4, for a PSSCH, it may be that m=0, 1, 2, 3, or for a PSBCH, it may be that m=0, 1, 2.

In Sidelink transport modes 3 and 4, $n_{ID}^{X}$ may be the same as Decimal representation of CRC on a PSCCH transmitted in a subframe which is the same as a PSSCH and may be given as the equation below.

$$n_{ID}^{X} = \sum_{i=0}^{L-1} p_i \cdot 2^{L-1-i}$$ <Equation 3>

In the above equation, p in a parity bit, and L is the number of parity bits.

$M_{sc}^{PSSCH}$ represents a band scheduled for a PSSCH transmission as the number of subcarriers.

The parameters shown in Equation 1 and Equation 2 above may be determined as represented in the following table in the case of a reference signal for a PSCCH.

TABLE 3

| Parameter | | PSCCH Sidelink transport modes 3 and 4 |
|---|---|---|
| Group hopping | | disabled |
| | $n_{ID}^{RS}$ | — |
| | $n_s$ | — |
| | $f_{ss}$ | 8 |
| Sequence hopping | | disabled |
| Cyclic shift | $n_{cs,\lambda}$ | {0, 3, 6, 9} |
| Orthogonal sequence | $\lfloor w^\lambda(\cdot) \rfloor$ | $[+1 +1 +1 +1]$ |

TABLE 3-continued

| Parameter | | PSCCH Sidelink transport modes 3 and 4 |
|---|---|---|
| Reference signal length | $M_{sc}^{RS}$ | $M_{sc}^{PSSCH}$ |
| Number of layers | $\upsilon$ | 1 |
| Number of antenna ports | P | 1 |

The parameters shown in Equation 1 and Equation 2 above may be determined as represented in the following table in the case of a reference signal for a PSBCH. $N_{ID}^{SL}$ is a Sidelink synchronization identity.

TABLE 4

| Parameter | | PSBCH Sidelink transport modes 3 and 4 |
|---|---|---|
| Group hopping | | disabled |
| | $f_{ss}$ | $\lfloor N_{ID}^{SL}/16 \rfloor \bmod 30$ |
| Sequence hopping | | disabled |
| Cyclic shift | $n_{cs,\lambda}$ | $\lfloor N_{ID}^{SL}/2 \rfloor \bmod 8$ |
| Orthogonal sequence | $\lfloor \ldots w^\lambda(m) \ldots \rfloor$ | $[+1 +1 +1]$ if $N_{ID}^{SL} \bmod 2 = 0$ |
| | | $[+1 -1 +1]$ if $N_{ID}^{SL} \bmod 2 = 1$ |
| Reference signal length | $M_{sc}^{RS}$ | $M_{sc}^{PSBCH}$ |
| Number of layers | $\upsilon$ | 1 |
| Number of antenna ports | P | 1 |

Hereinafter, the Present Document is Described.

In one example, in the case that a V2X communication is performed based on relatively short TRANSMISSION TIME INTERVAL (S-TTI) (in comparison with the legacy TTI (e.g., "1MS")), the following proposed schemes proposes an efficient CBR and/or CR measurement method.

Here, as an example, a V2X communication mode may be classified into (representatively) (A) (on a V2X resource pool pre-configured (/signaled) from (eNB (/network)) a mode in which an eNB signals (/controls) scheduling information related to V2X message transmission (/reception) (MODE #3) (e.g., a UE located in an eNB communication coverage (and/or in RRC_CONNECTED state) is main target) and/or (B) (on a V2X resource pool pre-configured (/signaled) from (eNB (/network)) a mode in which a UE determines (/controls) (independently) scheduling information related to V2X message transmission (/reception) (MODE #4) (e.g., a UE located inside/outside of an eNB communication coverage (and/or in RRC_CONNECTED/IDLE state) is main target). Here, as an example, in the present document, the wording "sensing operation" may be interpreted as a PSSCH-RSRP measurement operation based on PSSCH DM-RS SEQUENCE (scheduled by a PSCCH that succeeds decoding) and/or an S-RSSI measurement operation (based on V2X resource pool related subchannel).

Here, as an example, in the present document, the wording "reception" may be (extendedly) interpreted to (at least) one of (A) V2X channel (/signal) (e.g., PSCCH, PSSCH, PSBCH, PSSS/SSSS, etc.) decoding (/reception) operation (and/or WAN DL channel (/signal) (e.g., PDCCH, PDSCH, PSS/SSS, etc.) decoding (/reception) operation) and/or (B) sensing operation and/or (C) CBR measurement operation.

Here, as an example, in the present document, the wording "transmission" may be (extendedly) interpreted to V2X channel (/signal) (e.g., PSCCH, PSSCH, PSBCH, PSSS/SSSS, etc.) transmission operation (and/or WAN UL channel (/signal) (e.g., PUSCH, PUCCH, SRS, etc.) transmission operation.

Here, as an example, in the present document, the wording "CARRIER" may be (extendedly) interpreted to (at least) one of (A) pre-configured (/signaled) CARRIER SET (/GROUP) and/or (B) V2X resource pool, and the like. Here, as an example, in the present document, the wording "RS" may be interpreted to (at least) a DM-RS. Here, as an example, in the present document, the wording "scrambling" may be interpreted to (at least) PSSCH (/PSCCH) scrambling.

As described above, the definition of term and the abbreviation of term in the specification to be described below may be defined from 3 gpp TS 36 series unless there is separate description. Separately, the terms frequently used in this specification are defined as below.

S-PSCCH_L: This may mean the number of symbols included in S-TTI based PSCCH.

S-PSSCH_L: This may mean the number of symbols included in S-TTI based PSSCH.

S-PSCCH, S-PSSCH: These may mean S-TTI based PSCCH and PSSCH.

L-PSCCH, L-PSSCH: These may mean (LEGACY) PSCCH and PSSCH based on the legacy TTI 1MS TTI (or relatively long TTI than S-TTI) (L-TTI).

L-N_SS: L-SLOT index used for DM-RS sequence generation/sequence (group) hopping on (LEGACY) SLOT (L-SLOT) when transmitting based on L-TTI (or relatively long TTI than S-TTI) (e.g., $n_{ssf}^{PsscH}$)

L-N_SSF: L-TTI index used for scrambling on L-TTI when transmitting based on L-TTI (or relatively long TTI than S-TTI) (e.g., $n_{ssf}^{PSSCH}$)

S-N_SS: Index used for DM-RS sequence generation/hopping on S-TTI when transmitting based on S-TTI S-N_SSF: Index used for scrambling on S-TTI when transmitting based on S-TTI S-CBR: This may be CBR measurement value when transmitting based on S-TTI.

S-CR: This may be CR measurement value when transmitting based on S-TTI.

L-TTI: This may mean LEGACY SF of 1MS length.

Hereinafter, it is described examples for (relatively) short TTI and (relatively) long TTI.

In the future wireless communication system, considering traffic (or data) of various transport coverage/reliability/latency requirements and the like, variable TTI (channel/signal) may be introduced. As an example, after a BASIC RESOURCE UNIT is defined (/configured) in advance, (data related channel/signal transmission of a specific requirement) TTI may be defined as a combination of a single or plural basic resource units. At this time, an example for each TTI is described with reference to drawings as below.

Figure 10:
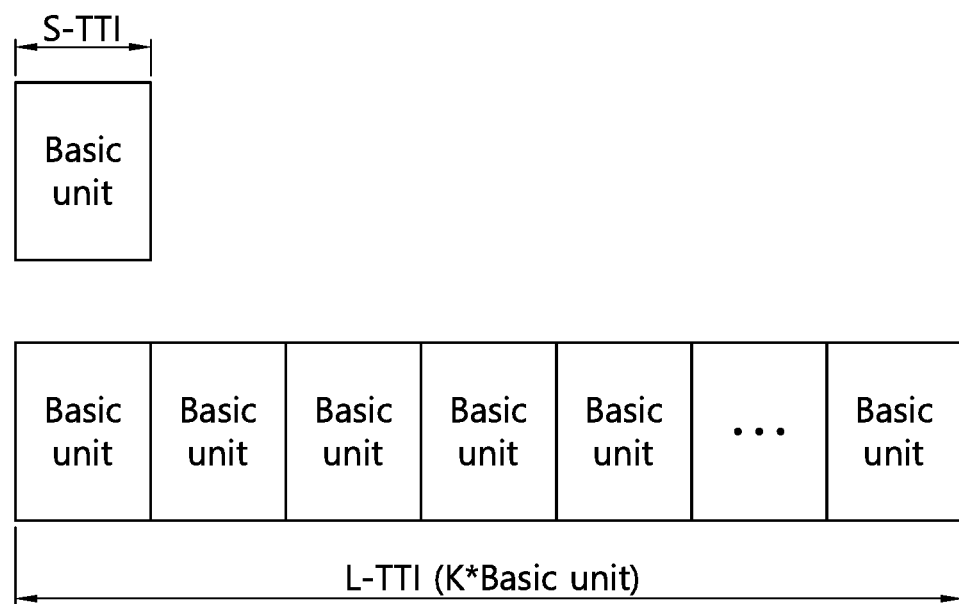
FIG. 10 schematically illustrates an example of an S-TTI and an L-TTI.

FIG. 10 schematically illustrates an example of an S-TTI and an L-TTI.

Referring to FIG. 10, in the case that the S-TTI is defined as a previously configured (/signaled) basic resource unit, the L-TTI may be interpreted as a form in which (previously configured (/signaled)) K S-TTIs (basic resource units) have been combined.

Figure 11:
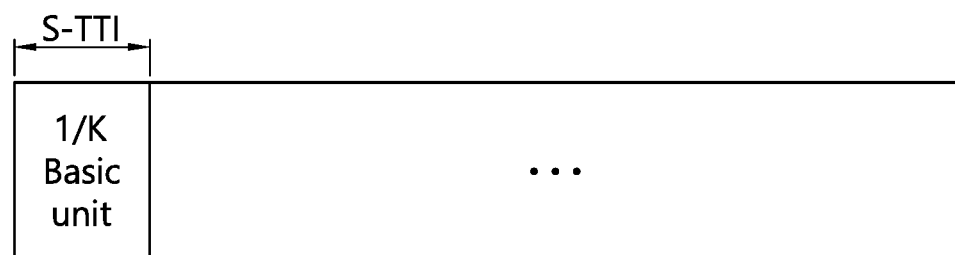
FIG. 11 schematically illustrates another example of an S-TTI and an L-TTI.
Figure 11:
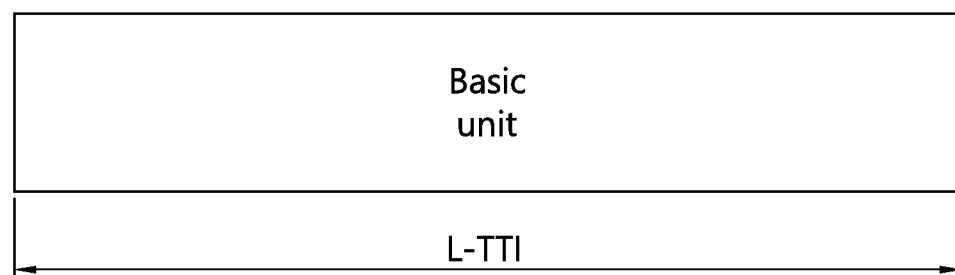

FIG. 11 schematically illustrates another example of an S-TTI and an L-TTI.

Referring to FIG. 11, in the case that the L-TTI is defined as a previously configured (/signaled) the basic resource unit, the S-TTI may be interpreted as a form in which the L-TTI (basic resource unit) has been split into (previously configured (/signaled)) K (e.g., a kind of MINI-BASIC RESOURCE UNIT).

Unlike in the example of the above figures, the S-TTI may have a form in which a plurality of (previously configured (/signaled)) basic resource units has been combined.

Hereinafter, an S-TTI combination example constructing the conventional 1MS SF is described (current LR WI UL AGREEMENT)—"OS" is an abbreviation of "OFDM SYMBOL".

Figure 12:
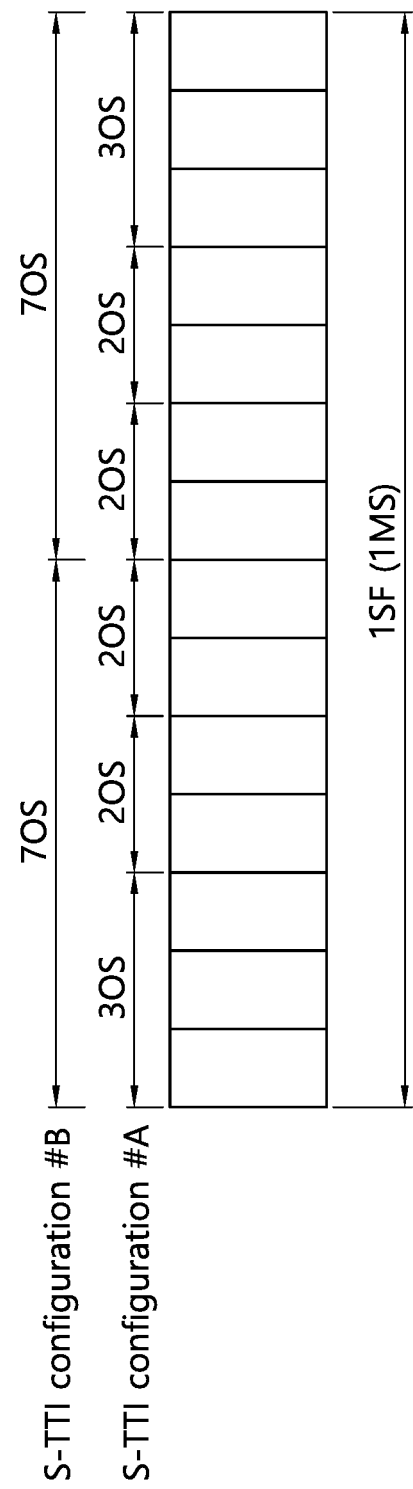
FIG. 12 schematically illustrates yet another example of an S-TTI and an L-TTI.

FIG. 12 schematically illustrates yet another example of an S-TTI and an L-TTI.

Referring to FIG. 12, for example, as in an S-TTI configuration #A, a first S-TTI may have the length of three OFDM symbols (OSs), a second S-TTI may have the length of two OFDM symbols, a third S-TTI may have the length of two OFDM symbols, a fourth S-TTI may have the length of two OFDM symbols, a fifth S-TTI may have the length of two OFDM symbols, and a sixth S-TTI may have the length of three OFDM symbols.

Alternatively, for example, as in an S-TTI configuration #B, a first S-TTI may have the length of seven OFDM symbols, and a second S-TTI may have the length of seven OFDM symbols.

Various examples of the relation between an S-TTI and an L-TTI have been illustrated so far. However, the aforementioned various examples of the S-TTIs and L-TTIs are merely examples for convenience of description, and a form of an S-TTI and an L-TTI are not limited to the disclosed forms.

As described above, in the future communication system, in the case that a V2X communication (/channel/signal) based on the TTI shorter than the conventional case (or variable TTI length) is introduced, it is required a definition of a way of performing CBR measurement and/or CR measurement (in relation to channel/signal based on short TTI (or variable TTI length)) by a UE.

In addition, together with the definition above (or separately), in the case that a UE supporting V2X communication based on short TTI (or variable TTI length) and a UE supporting V2X communication based on the legacy TTI (or relatively long TTI or fixed TTI length) only are coexisted, it is also required a definition of a way of performing CBR measurement and/or CR measurement such that the UE supporting V2X communication based on short TTI coexists efficiently with the UE supporting V2X communication based on the legacy TTI (or relatively long TTI or fixed TTI length) only.

Hereinafter, considering the problem above, it is described examples of a way of performing CBR and/or CR measurement for a UE that performs a V2X communication based on S-TTI.

Figure 13:
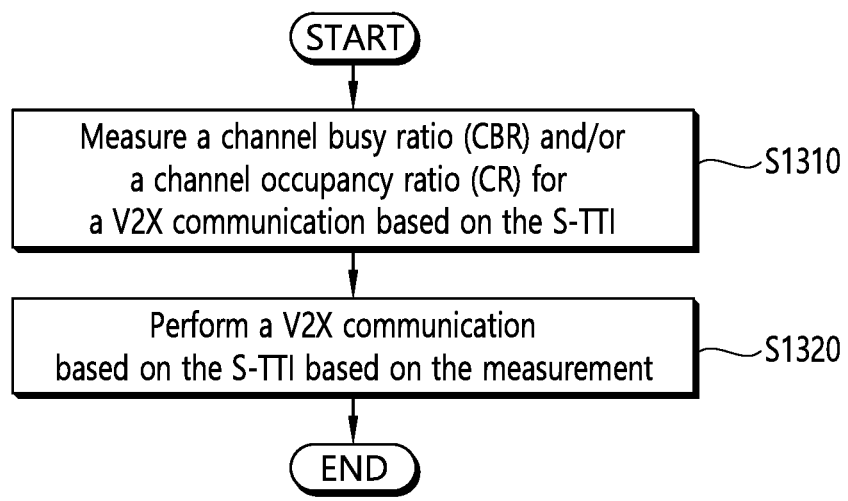
FIG. 13 is a flowchart of a method for performing a V2X communication based on S-TTI according to an embodiment of the present document.

FIG. 13 is a flowchart of a method for performing a V2X communication based on S-TTI according to an embodiment of the present document.

Referring to FIG. 13, a V2X UE measures a channel busy ratio (CBR) and/or a channel occupancy ratio (CR) for a V2X communication (/channel/signal) based on the S-TTI (step, S1310). That is, the V2X UE may determine each of the channel busy ratio (CBR) and/or the channel occupancy ratio (CR) for a V2X communication (/channel/signal) based on the S-TTI.

Here, the V2X UE may mean a UE that support a V2X communication based on relatively short TTI (or variable TTI length), and the V2X UE may be a UE that supports the V2X communication based on the legacy TTI (or relatively long TTI or fixed TTI length) as well as the V2X communication based on the relatively short TTI (or variable TTI length).

Hereinafter, S-CBR/CR measurement method is described in detail.

Here, when a UE performs a V2X communication based on S-TTI, as a method for an S-TTI UE to measure S-CBR/S-CR in the similar way of REL-14 LEGACY UE, it is described method 1. (example #1)S-CBR/S-CR is measured in a SUB-CHANNEL unit based on L-TTI, but MEASUREMENT/EVALUATION DURATION is defined in L-TTI unit, and method 2. (example #2)S-CBR/S-CR is measured in a SUB-CHANNEL unit based on S-TTI, but MEASUREMENT/EVALUATION DURATION is defined in L-TTI unit.

Later, as a method for an S-TTI UE to measure S-CBR/S-CR in a new scheme, it is described method 3. (example #3)S-CBR/S-CR is measured in a SUB-CHANNEL unit based on S-TTI, and MEASUREMENT/EVALUATION DURATION is also defined in S-TTI unit.

1. (example #1)S-CBR/S-CR is measured in a SUB-CHANNEL unit based on L-TTI, but MEASUREMENT/EVALUATION DURATION is defined in L-TTI unit As described above, in the case that a UE (i.e., advanced UE) supporting a V2X communication based on relatively short TTI (i.e., S-TTI) is introduced, a situation may occur that a V2X communication by a UE based on L-TTI (i.e., legacy UE) and a V2X communication by an advanced UE are coexisted (in the same resource pool).

In such a situation, in the case that the advanced UE performs CBR and/or CR measurement in a new method without considering the V2X communication based on L-TTI, an efficient (or equitable) resource sharing (/load division) is not established between the V2X communication of the advanced UE and the V2X communication of the legacy UE.

Accordingly, hereinafter, it is provided a method that S-CBR/S-CR is measured in a SUB-CHANNEL unit based on L-TTI (processing time is based on S-TTI standard), but MEASUREMENT/EVALUATION DURATION is defined in L-TTI unit in more detail.

In the case that the S-TTI UE performs a transmission in the $K^{th}$ S-TTI in L-TTI #N, the following CBR/CR measurement (or determination) method may be provided.

In the case that S-TTI of "(the $K^{th}$ S-TTI—minimum processing time (defined by the number of S-TTIs))" is belonged to L-TTI #Z, S-CBR measurement and/or S-CR measurement may be performed as below, respectively.

S-CBR measurement may be performed in SUB-CHANNEL unit based on L-TTI on [L-TTI #(Z−1MS-100MS), L-TTI #(Z−1MS-1MS)].

S-CR measurement may be performed in SUB-CHANNEL unit based on L-TTI on [L-TTI #(Z−1MS-A), L-TTI #(Z−1MS+B)] (e.g., A+B+1=1000MS, A≥500MS).

Particularly, in the case that a REL-14 UE (i.e., performs a transmission based on L-TTI) and an S-TTI UE share a resource pool, the rule may give to PENALTY to the S-TTI UE, relatively.

Hereinafter, the example of (example #1) is described with reference to a drawing.

Figure 14:
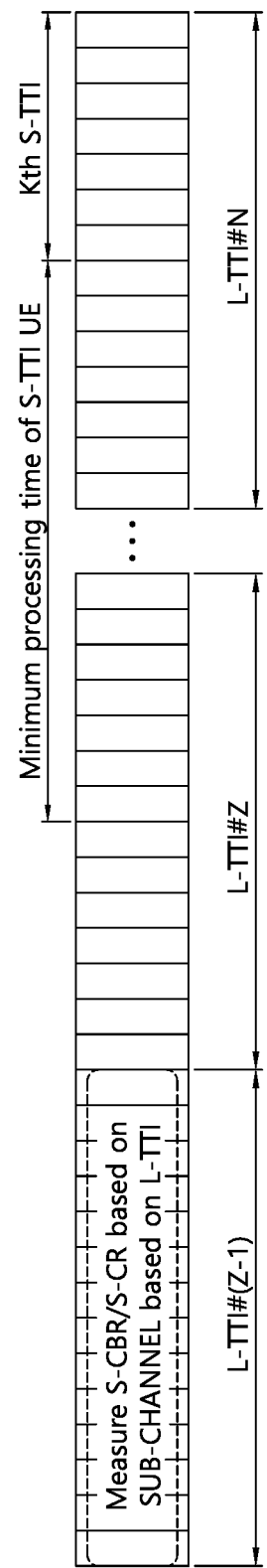
FIG. 14 schematically illustrates an example of CBR and/or CR measurement method according to (example #1).

FIG. 14 schematically illustrates an example of CBR and/or CR measurement method according to (example #1).

Referring to FIG. 14, it is assumed that an S-TTI UE performs a transmission in the $K^{th}$ S-TTI in L-TTI #N. Furthermore, the L-TTI herein is assumed to be 1 ms (i.e., 14 OFDM symbols), and the S-TTI is assumed to be 0.5 ms (i.e., 7OFDM symbols). In addition, it may be assumed that the S-TTI in the case of subtracting a minimum processing time of the S-TTI UE from the $K^{th}$ S-TTI is belonged to L-TTI #Z.

In such a case, the advanced UE performs S-CBR/S-CR measurement based on a subchannel based on L-TTI, and accordingly, the UE may perform S-CBR/S-CR measurement in 1 ms unit. Furthermore, since the duration for the UE to perform a measurement is also based on L-TTI, the advanced UE may perform the S-CBR/S-CR measurement as much as 100 ms (i.e., 100*(1 L-TTI length)).

2. (example #2)S-CBR/S-CR is measured in a SUB-CHANNEL unit based on S-TTI, but MEASUREMENT/EVALUATION DURATION is defined in L-TTI unit.

As described in (example #1), the advanced UE may CBR/CR measurement based on L-TTI. At this time, when the advanced UE performs CBR/CR measurement, it is not required to set L-TTI as a reference for all cases. Accordingly, hereinafter, it is provided a method that S-CBR/S-CR is measured in a SUB-CHANNEL unit based on S-TTI (processing time is based on S-TTI standard), but MEASUREMENT/EVALUATION DURATION is defined in L-TTI unit in more detail.

In the case that the S-TTI UE performs a transmission in the $K^{th}$ S-TTI in L-TTI #N, the following CBR/CR measurement (or determination) method may be provided.

In the case that S-TTI of "(the $K^{th}$ S-TTI—minimum processing time (defined by the number of S-TTIs))" is belonged to L-TTI #Z, S-CBR measurement and/or S-CR measurement may be performed as below, respectively.

S-CBR measurement may be performed in SUB-CHANNEL unit based on S-TTI on [L-TTI #(Z−1MS-100MS), L-TTI #(Z−1MS-1MS)].

S-CR measurement may be performed in SUB-CHANNEL unit based on S-TTI on [L-TTI #(Z−1MS-A), L-TTI #(Z−1MS+B)] (e.g., A+B+1=1000MS, A≥500MS).

Figure 15:
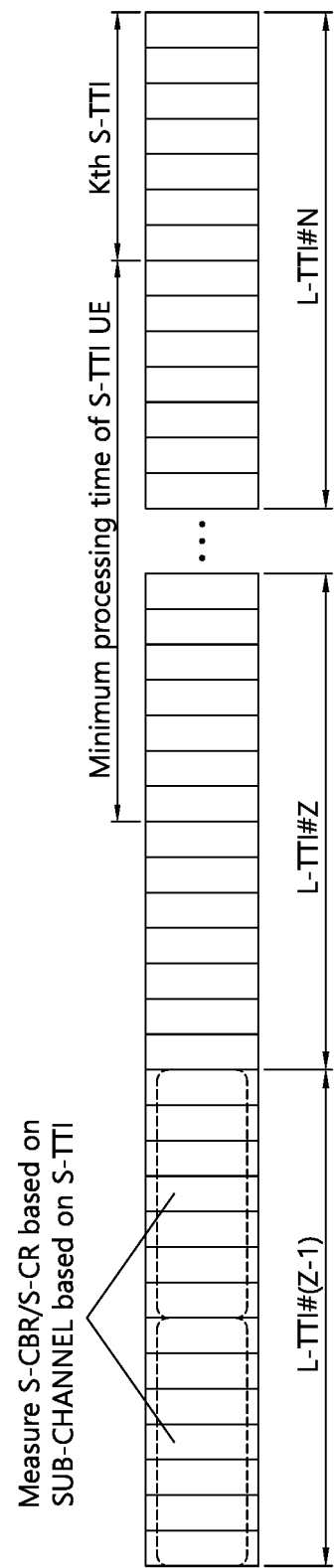
FIG. 15 schematically illustrates an example of CBR and/or CR measurement method according to (example #2).

FIG. 15 schematically illustrates an example of CBR and/or CR measurement method according to (example #2).

Referring to FIG. 15, it is assumed that an S-TTI UE performs a transmission in the $K^{th}$ S-TTI in L-TTI #N. Furthermore, the L-TTI herein is assumed to be 1 ms (i.e., 14 OFDM symbols), and the S-TTI is assumed to be 0.5 ms (i.e., 7OFDM symbols). In addition, it may be assumed that the S-TTI in the case of subtracting a minimum processing time of the S-TTI UE from the $K^{th}$ S-TTI is belonged to L-TTI #Z.

In such a case, the advanced UE performs S-CBR/S-CR measurement based on a subchannel based on S-TTI, and accordingly, the UE may perform S-CBR/S-CR measurement in 0.5 ms unit. Furthermore, since the duration for the UE to perform a measurement is based on L-TTI, the advanced UE may perform the S-CBR/S-CR measurement as much as 100 ms (i.e., 100*(1 L-TTI length)).

3. (example #3)S-CBR/S-CR is measured in a SUB-CHANNEL unit based on S-TTI, but MEASUREMENT/EVALUATION DURATION is also defined in S-TTI unit.

In the examples described above, when performing CBR/CR measurement, the methods for the advanced UE to consider L-TTI has been described to consider the legacy V2X communication.

However, since it may not an essential matter for the advanced UE to consider the V2X communication of the legacy UE (e.g., in the case of the resource pool in which only advanced UEs (based on S-TTI) are existed), different from the examples described above, it may also be provided a method for an S-TTI UE to measure S-CBR/S-CR in a new method.

In this case, the CBR/CR measurement method may be as below.

In the case that the S-TTI UE performs a transmission in the $K^{th}$ S-TTI in L-TTI #N, the following CBR/CR measurement (or determination) method may be provided.

In the case that S-TTI of "(the $K^{th}$ S-TTI—minimum processing time (defined by the number of S-TTIs))" corresponds to the $W^{th}$'S-TTI in L-TTI #Z, S-CBR measurement and/or S-CR measurement may be performed as below, respectively.

S-CBR measurement may be performed in SUB-CHANNEL unit based on S-TTI on [(the $W^{th}$ S-TTI in L-TTI #Z−100 S-TTI lengths), (the $W^{th}$ S-TTI in L-TTI #Z−1 S-TTI length)].

S-CR measurement may be performed in SUB-CHANNEL unit based on S-TTI on [(the Wth S-TTI in L-TTI #Z-A), (the Wth S-TTI in L-TTI #Z+B)] (e.g., A+B+1=1000 S-TTI lengths, A≥500 S-TTI lengths).

Figure 16:
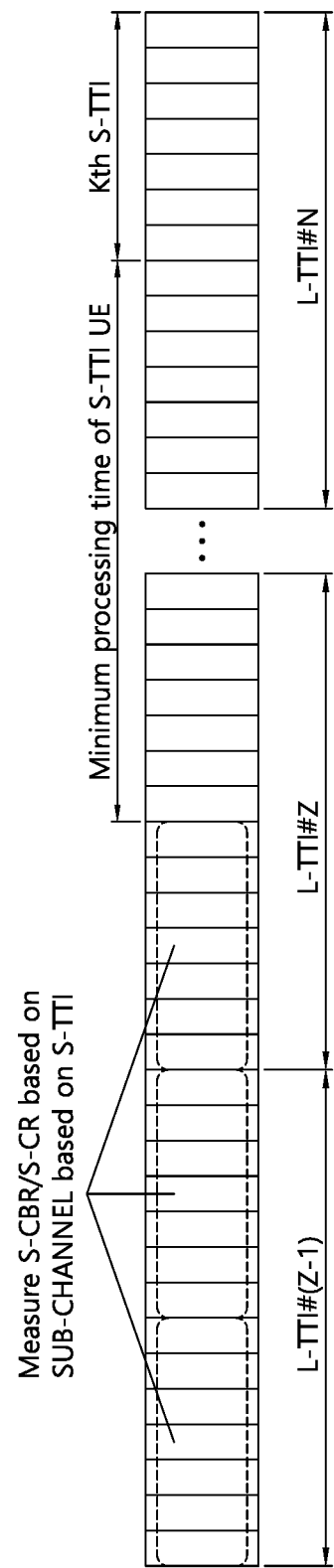
FIG. 16 schematically illustrates an example of CBR and/or CR measurement method according to (example #3).

FIG. 16 schematically illustrates an example of CBR and/or CR measurement method according to (example #3).

Referring to FIG. 16, it is assumed that an S-TTI UE performs a transmission in the $K^{th}$ S-TTI in L-TTI #N. Furthermore, the L-TTI herein is assumed to be 1 ms (i.e., 14 OFDM symbols), and the S-TTI is assumed to be 0.5 ms (i.e., 7OFDM symbols). In addition, it may be assumed that the S-TTI in the case of subtracting a minimum processing time of the S-TTI UE from the $K^{th}$ S-TTI is belonged to L-TTI #Z.

In such a case, the advanced UE performs S-CBR/S-CR measurement based on a subchannel based on S-TTI, and accordingly, the UE may perform S-CBR/S-CR measurement in 0.5 ms unit. Furthermore, since the duration for the UE to perform a measurement is also based on S-TTI, the advanced UE may perform the S-CBR/S-CR measurement as much as 50 ms (i.e., 100*(1 S-TTI length)).

Later, the UE may perform a V2X communication based on S-TTI based on the measurement (step, S1320).

At this time, when a transmission based on S-TTI is performed, "TIME GAP BETWEEN INITIAL TX AND RE-TX (INI-RE-GAP)" field value on SCI FORMAT1 may be counted in S-TTI GRANULARITY (or unit).

(Example) If the INI-RE-GAP field indicates the K value, this means that an INITIAL TX and a RE-TX are separated as much as K S-TTIs (current LR WI UL AGREEMENT).

Here, for the legacy TTI, the maximum value of the spacing between the initial transmission and the retransmission is 15 ms (i.e., 15 subframes). When this is applied to S-TTI, the maximum value of the spacing between the initial transmission and the retransmission based on S-TTI may be as much as 15*S-TTI.

Detailed description for SCI format 1 may be as below.
<SCI FORMAT 1>
SCI format 1 may be used for scheduling PSSCH.
Here, through SCI format 1, the following information (or field) may be transmitted.
  priority
  resource reservation
  frequency resource location of initial transmission and retransmission
  Time gap between initial transmission and retransmission
  Modulation and coding scheme
  Retransmission index
  Reserved information bit As such, when the UE determines information for channel busy ratio (CBR) and/or information for channel occupancy ratio (CR) for a V2X communication based on S-TTI and performs the V2X communication based on S-TTI based on the determination, the following matters may be additionally considered.

First, for each S-TTI length, the following (part of) parameter related to CONGESTION CONTROL may be differently configured.
  PHY parameter based on CBR/PPPP (e.g., MCS, number of MIN/MAX RXs, maximum transmission power, whether to perform retransmission, etc.),
  CR_LIMIT
  CHANNEL BUSY determination threshold value (when measuring CBR)

Furthermore, in the case that there are several S-TTIs (format lengths), the UE that is available to support an S-TTI transmission may measure CBR for a minimum (length)S-TTI which is transmittable by the UE itself, and/or measure CBR for a minimum (length)S-TTI which is allowed in a POOL, and/or the UE that is available to transmit S-TTI may measure CBR for both L-TTI and S-TTI, operate based on the CBR of S-TTI (or L-TTI) when transmitting S-TTI and operate based on the CBR of L-TTI (or S-TTI) when transmitting L-TTI, and/or report two values individually (or independently) (to a network using a predefined signaling) (or report only the CBR related to L-TTI (or S-TTI) using a predefined signaling).

The V2X communication based on S-TTI using the (a part of or the whole) proposed method may be performed depending on whether the V2X communication based on S-TTI and the V2X communication based on L-TTI are coexisted (in the same resource pool). This is described with reference to the drawing as below.

Figure 17:
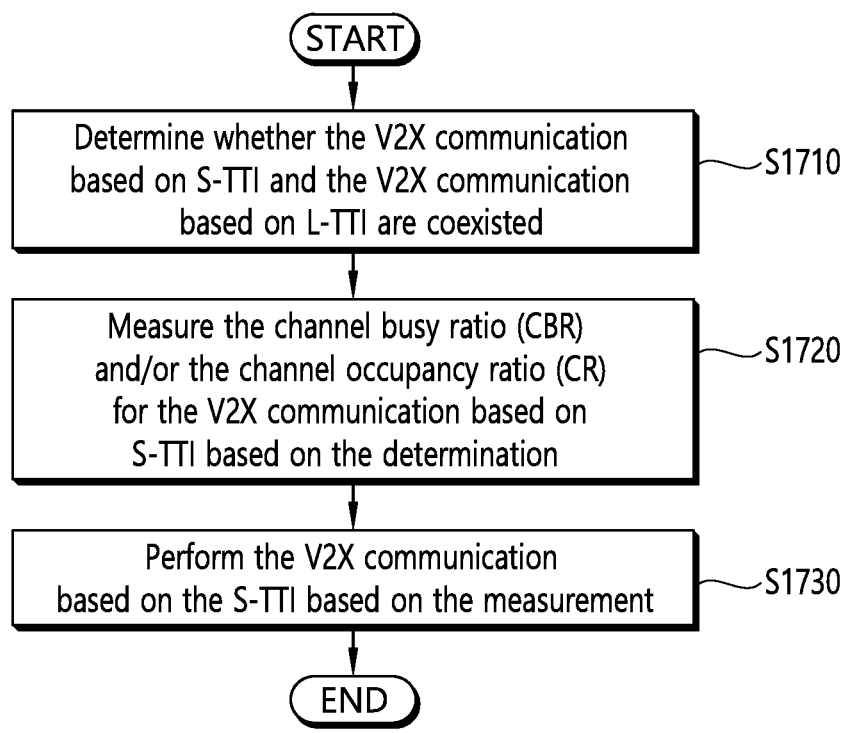
FIG. 17 is a flowchart of a method for performing a V2X communication based on S-TTI according to another embodiment of the present document.

FIG. 17 is a flowchart of a method for performing a V2X communication based on S-TTI according to another embodiment of the present document.

Referring to FIG. 17, the UE determines whether the V2X communication based on S-TTI and the V2X communication based on L-TTI are coexisted (step, S1710). At this time, the UE may mean a UE that performs the V2X communication based on S-TTI (i.e., advanced UE).

Later, based on the determination, the UE may measure the channel busy ratio and/or the channel occupancy ratio for the V2X communication based on S-TTI (step, S1720).

For example, in the case that the V2X communication based on S-TTI and the V2X communication based on L-TTI are not coexisted, the UE may not consider that a legacy UE is influenced by its own V2X communication, and accordingly, the UE may perform CBR/CR measurement considering S-TTI only. That is, the advanced UE may measure S-CBR/S-CR in SUB-CHANNEL unit based on S-TTI and perform CBR/CR measurement through the method of also defining MEASUREMENT/EVALUATION DURATION in S-TTI unit.

Alternatively, for example, in the case that the V2X communication based on S-TTI and the V2X communication based on L-TTI are coexisted, it may be applied the methods for an S-TTI UE to measure S-CBR/S-CR in the similar way of REL-14 LEGACY UE.

However, the example of performing CBR/CR measurement based on whether the V2X communication based on S-TTI and the V2X communication based on L-TTI are coexisted described above is just an example for the convenience of description, but the present document is not limited to the examples described above.

Later, based on the measurement, the UE may perform the V2X communication based on S-TTI (step, S1730).

Since the examples for the proposed method described above may also be included as one of the implementation methods of the present document, it is an apparent fact that the examples may be regarded as a sort of proposed methods.

In addition, the proposed methods described above may be independently implemented, but a part of the proposed methods may be implemented in a form of combination (or being merged).

As an example, the proposed method has been described based on 3GPP LTE system for the convenience of description in the present document, but the range of system to which the proposed method is applied may be extended to other system except the 3GPP LTE system.

For example, the proposed methods of the present document may be extended for a D2D communication.

Here, for example, the D2D communication means that a UE communicates with another UE using direct wireless channel, and here, for example, the UE may mean a UE of a user, but a network equipment such as a base station may be regarded as a sort of UE in the case that the network equipment transmits/receives a signal according to a communication scheme with the UE.

In addition, as an example, the proposed methods of the present document may be limitedly applied to MODE 2 V2X operation (and/or MODE 4 V2X operation) only.

Furthermore, as an example, the proposed methods of the present document may be limitedly applied to pre-configured (/signaled) (specific) V2X channel (/signal) transmission (e.g., PSSCH (and/or (interlinked PSCCH and/or PSBCH))).

In addition, as an example, the proposed methods of the present document may be limitedly applied to the case that a PSCCH (interlinked) with a PSSCH is transmitted with being ADJACENT (and/or NON-ADJACENT) (on a frequency domain) (and/or a transmission based on pre-configured (/signaled) MCS (and/or coding rate and/or RB) (value (/range)) is performed)).

Furthermore, as an example, the proposed methods of the present document may be limitedly applied between MODE #3 (and/or MODE #4) V2X CARRIER (and/or (MODE #4 (/3)) SL (/UL) SPS (and/or SL (/UL) DYNAMIC SCHEDULING) CARRIER).

In addition, as an example, the proposed methods of the present document may be limitedly applied to a synchronous signaling between CARRIERS (transmission (and/or reception)) resource position and/or number (and/or subframe position related to V2X resource pool and/or number (and/or subchannel size and/or number)) are the same (and/or (partially) different).

Figure 18:
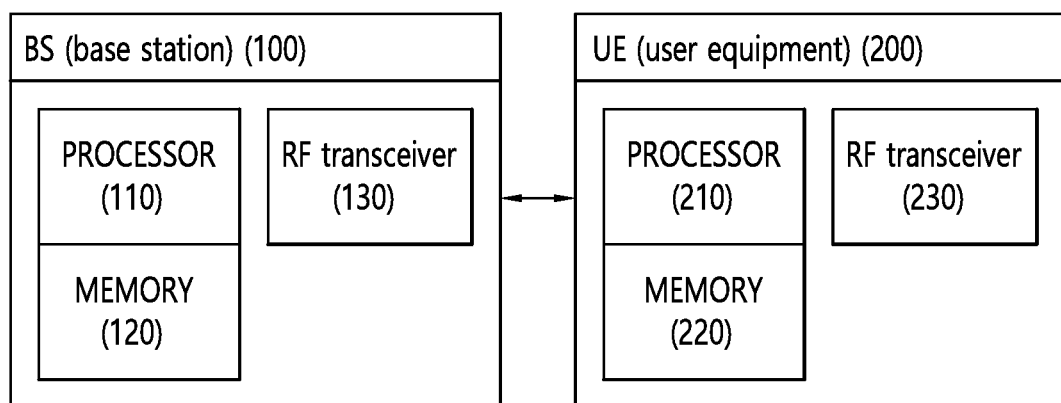
FIG. 18 is a block diagram illustrating a communication device in which the embodiment of the present document is implemented.

FIG. 18 is a block diagram illustrating a communication device in which the embodiment of the present document is implemented.

Referring to FIG. 18, a base station 100 includes a processor 110, a memory 120 and a transceiver 130. The depicted processor, memory and transceiver may be implemented in separate chips, respectively, or at least two blocks/functions may be implemented in a single chip.

The processor 110 implements proposed functions, processes and/or methods. The memory 120 is connected to the processor 110 and stores various types of information for driving the processor 110. The transceiver 130 is connected to the processor 110 and transmits and/or receives radio signals.

A UE 200 includes a processor 210, a memory 220 and a transceiver 230. The processor 210 implements proposed functions, processes and/or methods. The memory 220 is connected to the processor 210 and stores various types of information for driving the processor 210. The transceiver 230 is connected to the processor 210 and transmits and/or receives radio signals. The UE 200 may transmit/retransmit V2X signal to another UE according to the method described above.

The processor 110 or 210 may include Application-Specific Integrated Circuits (ASICs), other chipsets, logic circuits, and/or data processors. The memory 120 or 220 may include Read-Only Memory (ROM), Random Access Memory (RAM), flash memory, memory cards, storage media and/or other storage devices. The transceiver 130 or 230 may include one or more antenna for transmitting and/or receiving radio signals. When the above-described embodiment is implemented in software, the above-described method may be implemented using a module (process or function) which performs the above function. The module may be stored in the memory 120 or 220 and executed by the processor 110 or 210. The memory 120 or 220 may be disposed to the processor 110 or 210 internally or externally and connected to the processor 110 or 210 using a variety of well-known means.

Figure 19:
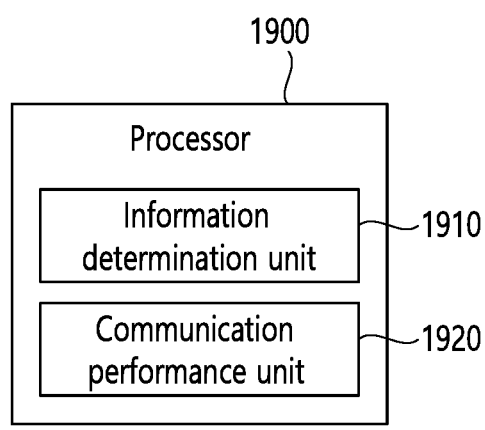
FIG. 19 is a block diagram illustrating an example of a device included in a processor.

FIG. 19 is a block diagram illustrating an example of a device included in a processor.

Referring to FIG. 19, a processor 1900 may include an information determination unit 1910 and a communication performance unit 1920, as a functional aspect.

Here, the information determination unit 1910 may have the function of determining information for channel busy ratio and/or information for channel occupancy ratio for a V2X communication based on S-TTI.

The communication performance unit 1920 may have the function of performing the V2X communication based on S-TTI based on the determination.

The description for the device included in the processor described above is just an example, but the processor may further include another functional element or device. In addition, a particular example for the operation performed by each functional device may be as described above, and accordingly, a repeated description is omitted.

What is claimed is:

1. A method for a short transmission time interval (S-TTI) shorter than a legacy transmission time interval (L-TTI) in a wireless communication system, the method performed by a vehicle to X (V2X) User Equipment (UE) and comprising:
measuring a channel busy ratio (CBR) or a channel occupancy ratio (CR); and
performing a V2X communication based on either the CBR or the CR,
wherein the S-TTI has a variable length,
wherein the L-TTI corresponds to a plurality of the S-TTIs,
wherein the CBR or the CR is measured based on the S-TTI in a resource pool,
wherein the measurement of the CBR or the CR is performed based on subchannels related to S-TTI units,
wherein a duration of the measurement of the CBR or the CR is determined based on S-TTI units,
wherein, when the S-TTI on a timing of subtracting a minimum processing time from the S-TTI for the V2X UE to perform a transmission corresponds to a Wth S-TTI in the L-TTI having index Z value, the V2X UE measures the CBR in the subchannel unit based on the S-TTI from a timing of subtracting 100 S-TTI lengths from the Wth S-TTI in the L-TTI having index Z value to a timing of subtracting 1 S-TTI length from the Wth S-TTI in the L-TTI having index Z value,
wherein the Z is an integer of 0 or more, and
wherein the W is a positive integer.

2. The method of claim 1, wherein, when the S-TTI is a basic resource unit, the L-TTI is a combination of K basic resource units, and
wherein the K is a positive integer.

3. The method of claim 1, wherein, when the L-TTI is a basic resource unit, the S-TTI is a division of the basic resource unit divided into X, and
wherein the X is a positive integer.

4. A method for a short transmission time interval (S-TTI) shorter than a legacy transmission time interval (L-TTI) in a wireless communication system, the method performed by a vehicle to X (V2X) User Equipment (UE) and comprising:
measuring a channel busy ratio (CBR) or a channel occupancy ratio (CR); and
performing a V2X communication based on either the CBR or the CR,
wherein the S-TTI has a variable length,
wherein the L-TTI corresponds to a plurality of the S-TTIs,
wherein the CBR or the CR is measured based on the S-TTI in a resource pool,
wherein the measurement for the CBR or the CR is performed based on subchannels related to S-TTI units,
wherein a duration of the measurement for the CBR or the CR is determined based on S-TTI units,
wherein, when the S-TTI on a timing of subtracting a minimum processing time from the S-TTI for the V2X UE to perform a transmission corresponds to a Wth S-TTI in the L-TTI having index Z value, the V2X UE measures the CR in the subchannel unit based on the S-TTI from a timing of subtracting A from the Wth S-TTI in the L-TTI having index Z value to a timing of adding B to the Wth S-TTI in the L-TTI having index Z value,
wherein the Z is an integer of 0 or more,
wherein the W is a positive integer,
wherein each the A and the B is in a unit of 1 S-TTI length,
wherein a value adding the B and 1 S-TTI length to the A has 1000 S-TTI lengths, and
wherein the A is equal to or greater than 500 S-TTI lengths.

5. A vehicle-to-X (V2X) User Equipment (UE) for a short transmission time interval (S-TTI) shorter than a legacy transmission time interval (L-TTI) in a wireless communication system, comprising:
a transceiver for transmitting and receiving a radio signal; and
a processor operatively coupled to the transceiver, wherein the processor is adapted to:
measure a channel busy ratio (CBR) or a channel occupancy ratio (CR); and
perform a V2X communication based on either the measured CBR or the measured CR,
wherein the S-TTI has a variable length,
wherein the L-TTI corresponds to a plurality of the S-TTIs,
wherein the CBR or the CR is measured based on the S-TTI in a resource pool,
wherein the measurement of the CBR or the CR is performed based on subchannels related to S-TTI units,
wherein a duration of the measurement of the CBR or the CR is determined based on S-TTI units,
wherein, when the S-TTI on a timing of subtracting a minimum processing time from the S-TTI for the V2X UE to perform a transmission corresponds to a Wth S-TTI in the L-TTI having index Z value, the V2X UE measures the CBR in the subchannel unit based on the S-TTI from a timing of subtracting 100 S-TTI lengths from the Wth S-TTI in the L-TTI having index Z value to a timing of subtracting 1 S-TTI length from the Wth S-TTI in the L-TTI having index Z value,
wherein the Z is an integer of 0 or more, and
wherein the W is a positive integer.

* * * * *